US006198557B1

(12) United States Patent
Dultz et al.

(10) Patent No.: US 6,198,557 B1
(45) Date of Patent: Mar. 6, 2001

(54) TELECOMMUNICATION SYSTEM HAVING FREQUENCY-DIVIDING OPTICAL COMPONENTS FOR THE PARALLEL PROCESSING OF OPTICAL PULSES

(75) Inventors: Wolfgang Dultz, Frankfurt am Main; Hans Koops, Ober-Ramstadt, both of (DE); Erna Frins, Montevideo (UY); Gerald Meltz, Avon, CT (US)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 08/882,638

(22) Filed: Jun. 25, 1997

(51) Int. Cl.⁷ .................................................. H04J 14/02
(52) U.S. Cl. .......................................... 359/127; 359/140
(58) Field of Search ..................................... 359/124, 127, 359/128, 129, 130, 131, 140

(56) References Cited

U.S. PATENT DOCUMENTS

| | | | |
|---|---|---|---|
| 3,920,983 | * 11/1975 | Schlafer et al. | 359/127 |
| 4,405,199 | * 9/1983 | Ogle et al. | 356/228 |
| 4,822,127 | * 4/1989 | Kamiya et al. | 350/96.15 |
| 4,839,884 | * 6/1989 | Schloss | 372/48 |
| 5,064,263 | * 11/1991 | Stein | 359/129 |
| 5,099,114 | * 3/1992 | Matsumoto et al. | 359/124 |
| 5,278,687 | * 1/1994 | Jannson et al. | 359/124 |
| 5,355,237 | * 10/1994 | Lang et al. | 359/130 |
| 5,450,223 | * 9/1995 | Wagner et al. | 359/124 |
| 5,546,481 | 8/1996 | Meltz et al. | 385/11 |
| 5,631,768 | * 5/1997 | Bruno | 359/333 |
| 5,671,304 | * 9/1997 | Duguay | 385/17 |
| 5,838,470 | * 11/1998 | Radehaus et al. | 359/124 |
| 5,887,090 | * 3/1999 | Rudolph et al. | 385/24 |
| 5,929,986 | * 7/1999 | Slater et al. | 356/326 |
| 5,930,015 | * 7/1999 | Yamamoto et al. | 359/125 |

FOREIGN PATENT DOCUMENTS

| | | |
|---|---|---|
| 196 30 705 | 3/1997 | (DE) . |
| 196 09 234 | 9/1997 | (DE) . |

OTHER PUBLICATIONS

Yu, F. et al., Photorefractive Fiber and Crystal Devices: Materials, Optical Properties, and Applications II, Proceedings, SPIE—The International Society for Optical Engineering, vol. 2849, pp. 248–256.

H. Koops, Photonic crystals built by three–dimensional aditive lithography enable integrated optic of high density, SPIE, vol. 2849/29 (Denver 1996).

* cited by examiner

*Primary Examiner*—Leslie Pascal
(74) *Attorney, Agent, or Firm*—Kenyon & Kenyon

(57) ABSTRACT

A telecommunication system having frequency-dividing optical components where light pulses having different frequencies are coupled out of a optical fiber by fiber grating and/or photonic crystals and imaged by focusing elements outside of the optical fiber. The fiber grating for different frequencies can be used in a single period or in different periods disposed one after the other. The photonic crystals can be used at the optical fiber extremity or etched in a channel or trench in a glass fiber. Delay elements are added to ensure that different frequency light pulses are imaged simultaneously in a given and desired time relation as required for further parallel processing.

21 Claims, 6 Drawing Sheets

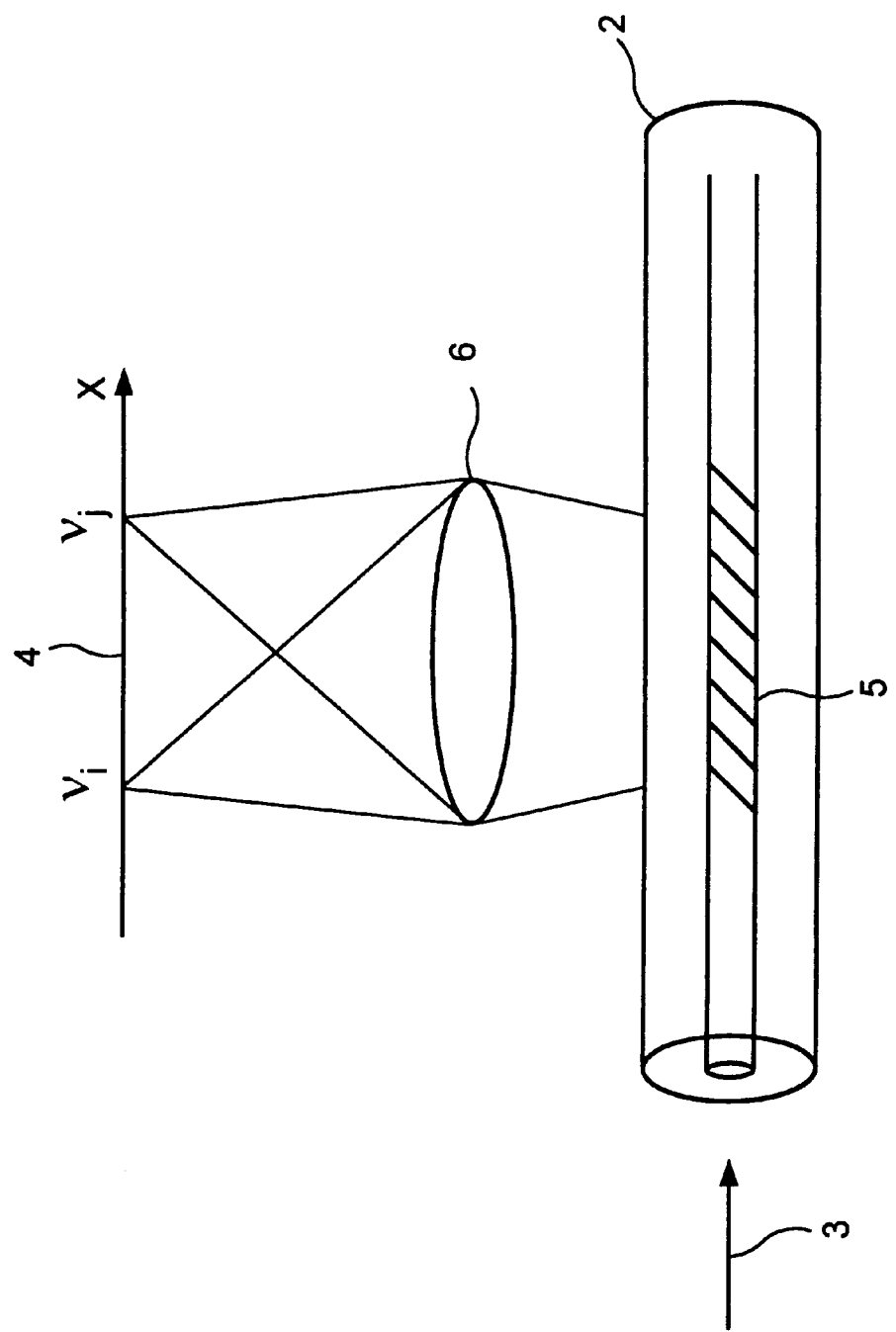
F I G. 2a

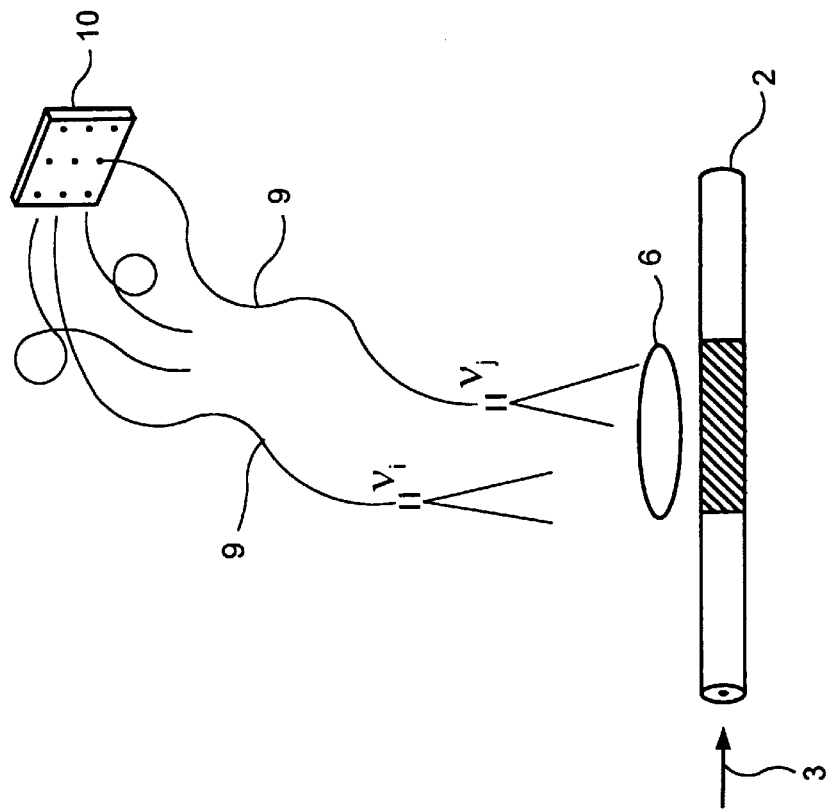
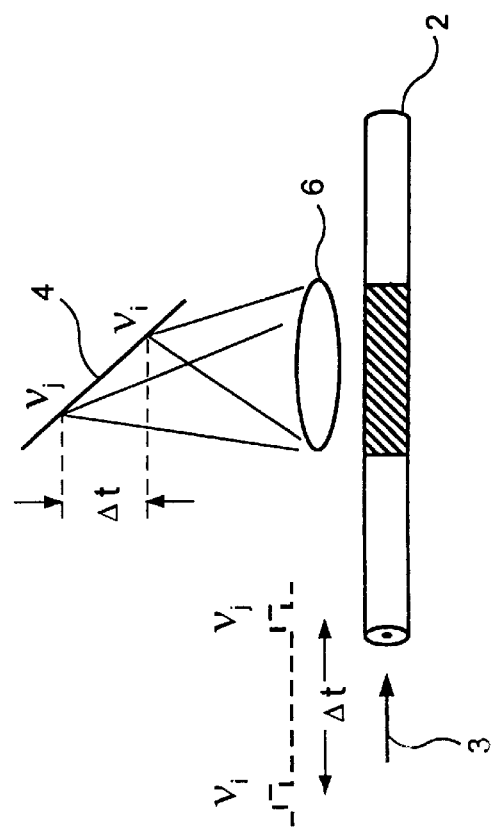
FIG. 5b
FIG. 5a

TELECOMMUNICATION SYSTEM HAVING FREQUENCY-DIVIDING OPTICAL COMPONENTS FOR THE PARALLEL PROCESSING OF OPTICAL PULSES

FIELD OF THE INVENTION

The present invention relates to a telecommunication system having frequency-dividing optical components for parallel processing of optical pulses, and more particularly to the use of fiber gratings and photonic-crystals for the spatial distribution of the frequency-coded optical pulses.

RELATED TECHNOLOGY

Optical telecommunications nearly always take place through a sequence of individual, binary-coded light pulses. Since transmission frequencies are already advancing today into ranges which no longer permit electronic data processing, and especially not the complex encoding and decoding required of secret communications, there is a considerable need for optical elements which can read chronological bit sequences into a single- or multi-dimensional spatial areal, and then process them further in an optically parallel manner. An optical, parallel processor is capable of simultaneously transforming a large quantity of binary or analog signals, arranged as an image or a pattern and, thus, works considerably faster than an electronic computer. When working with areals (areas) of 1000×1000 optical points (pixels), a parallel processing of $10^6$ signals can be readily achieved and serves as an exceptional time saver for certain numerical operations, such as a Fourier transformation. Since Fourier transformations comprise an essential component of machine pattern recognition, it is precisely the encoding and decoding of communications that could be realized easily and very quickly in terms of optics.

It is known that electro-optical components which read chronological pulse sequences into spatial areals have a Brownian tube type design. At the present time, as shown in German Patent No. 196 09 234.5 (H. Koops, filed March 1996), which is not necessarily prior art to the present invention, it is only in micro-tubes that electron beams are able to be deflected quickly enough to feed signals in the multi-gigahertz range.

Another method encodes the individual, optical pulses optionally with the aid of light polarization. The first, third, fifth, etc. of each odd-numbered pulse is polarized, for example, vertically, and all even-numbered pulses are polarized horizontally-linearly. The even and odd pulses are then able to be separated locally in each case with the aid of a polarizing beam splitter. Cascading renders possible a greater degree of separation. The advantage of this method is that the separating element- the beam splitter, is purely passive. After the pulses have been electro-optically polarization-encoded, for example, there is no longer a need for an active switching operation. Obviously, the drawback of the method is the small number of only two parallel channels per cascade stage.

SUMMARY OF THE INVENTION

The present invention is characterized by individual, successive optical pulses being frequency-encoded instead of polarization-encoded. Since the light frequency within an optical telecommunication window can be easily altered by 100 nm, and on the other hand, since semiconductor lasers are able to be detuned by several nanometers by varying the applied voltage, it is possible, in principle, for different frequencies to be assigned within a broad range to optical pulses. To this end, a plurality of semiconductor lasers having different center-of-mass frequencies should be electrically switchable with respect to their radiation frequencies. The resulting optical pulses having different frequencies are then binary-encoded for telecommunication purposes and are fed into the transmitting glass fiber. Thus, a sequence of pulses, the first having the frequency $v_1$, is impressed upon the communication. Here, for example, it may be that $v_1 < v_2 < v_3 < \text{---} < v_i < v_{i+1} < \text{---} < v_N$.

BRIEF DESCRIPTION OF THE DRAWINGS

FIGS. 2a and 2b show the use of diagonally arranged fiber gratings to couple the light out of the optical fiber, according to two embodiments of the present invention.

FIGS. 5a and 5b show the delay between optical pulses of different frequencies and the use of a delay element to ensure that the optical pulses are imaged simultaneously on a matrix, according to an embodiment of the present invention.

DETAILED DESCRIPTION

Figure 1:
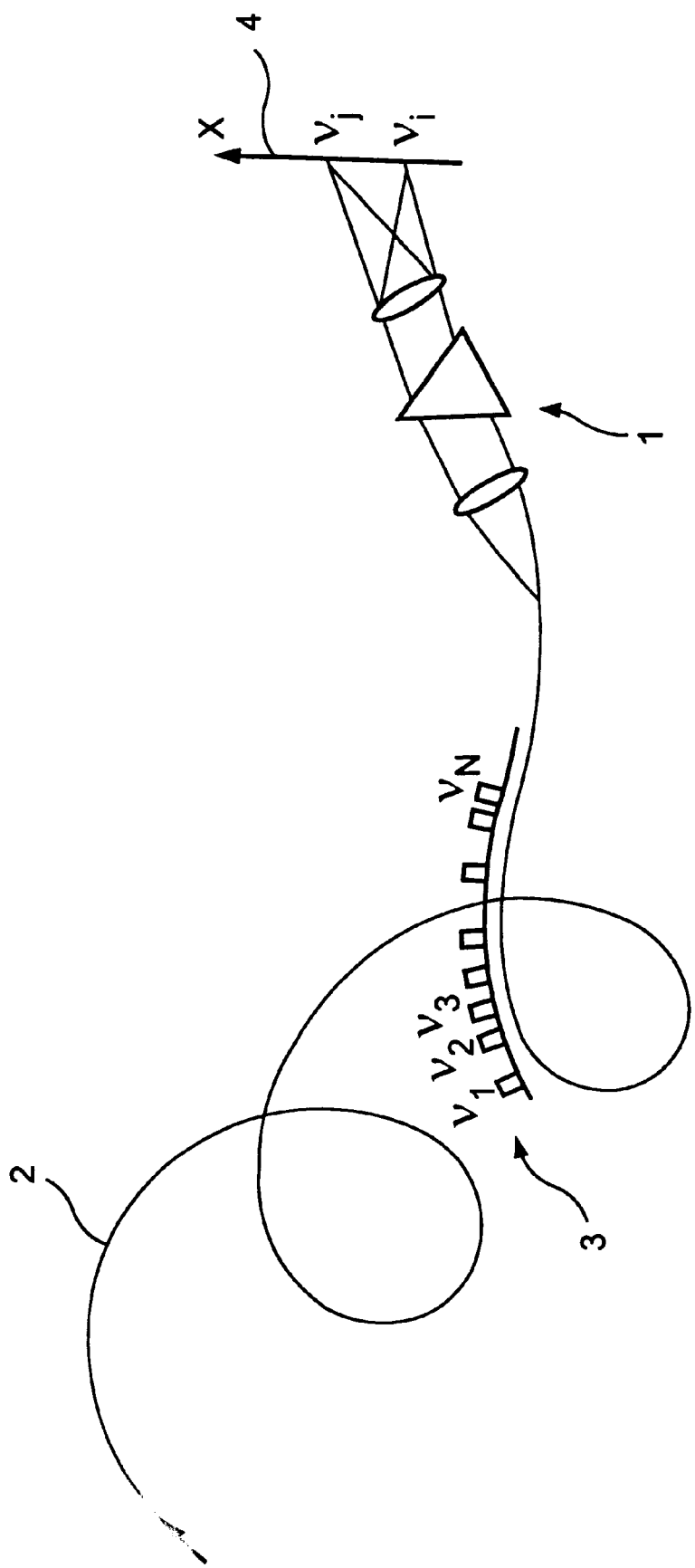
FIG. 1 shows the use of a passive optical component to divide light at the extremity of an optical fiber, according to an embodiment of the present invention.

The present invention uses a passive, optical component which is able to divide light spectrally-locally to distribute the optical pulses within a spatial area. Referring to FIG. 1, an optical component 1 of this kind is any prism-based or grating-based spectrograph (but also includes the two-beam and multi-beam interferometers) incorporated into or at the end of an optical fiber 2 carrying a frequency encoded digital or analog message 3 as an optical pulse for imaging on a linear or fiber areal 4. Also, fiber gratings can be used as spectrographs for the spatial distribution of the frequency-coded optical pulses. Such gratings are known for example from U.S. Pat. No. 5,546,481 to Meltz et al., which patent is hereby expressly incorporated by reference herein.

Figure 2B:
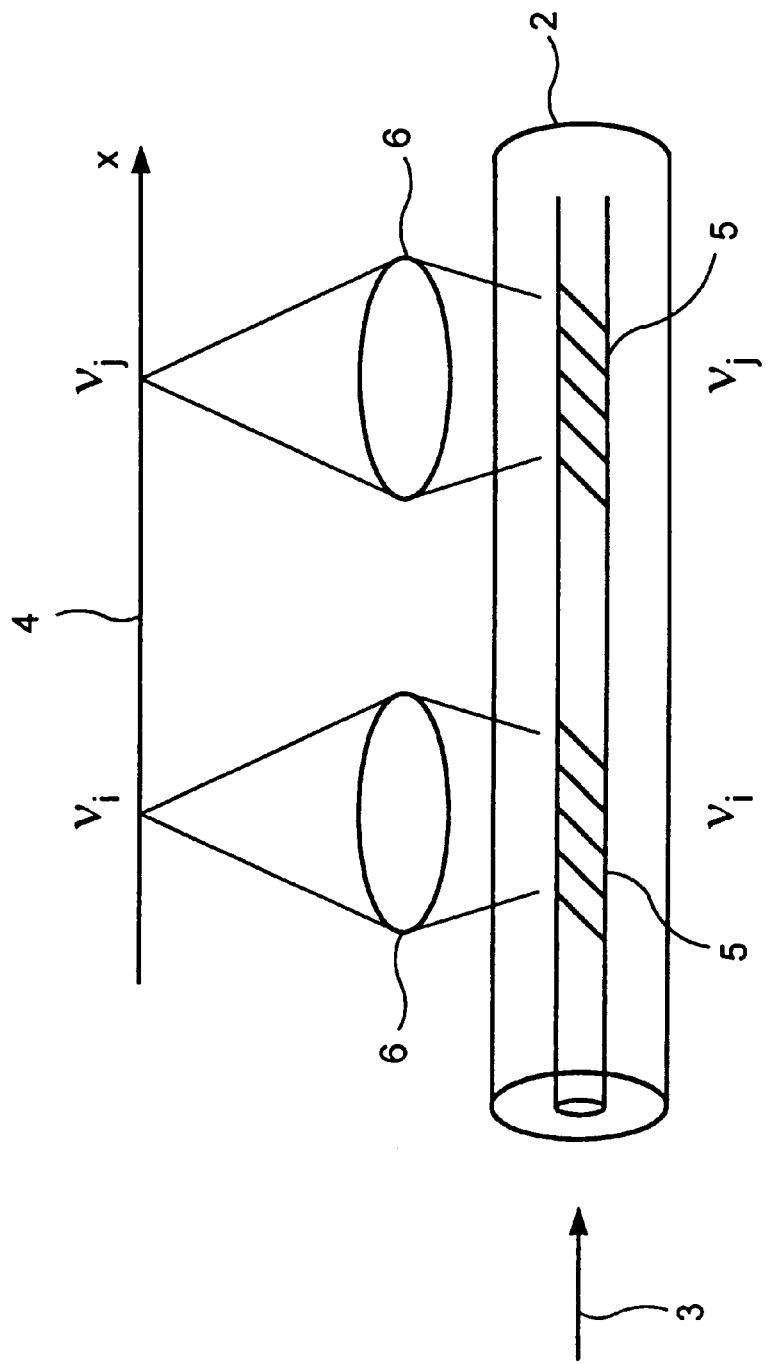

As shown in FIGS. 2a and 2b, blazed gratings 5 are arranged diagonally, in order to direct the light out of the optical fiber. By using suitable focusing elements 6, such as anamorphotic lenses as shown in German Patent Application No. 196 30 705 A1 (July 1996, published March 1997) to H. Koops, which is hereby incorporated by reference herein, the beams of one single frequency (color) are able to be focused on a linear areal 4, in a punctiform manner. Each frequency $v_i$ has a different focal point, all situated, for example, on one line parallel to the optical fiber 2.

With regard to lenses 6, these can be constructed as well directly on the optical fiber. For example, German Patent Application No. 197 13 374.6 (filed March 1997) to Koops et al., hereby incorporated by reference herein, shows a method of fashioning such lenses. In an optical fiber having a blazed fiber-Bragg grating, a lens can be placed on the cladding of the fiber. The lenses to be used are mounted on the cylindrical fiber cladding surfaces and can be manufactured with the aid of vapor deposition technology, corpuscular beam lithography characterized by a high depth of focus, and with the aid of X-ray lithography using intensity-modulated masks. The lens can also be constructed by means of polymerization, i.e., through beam polymerization of monomeric materials adsorbed or condensed on the surface, with the aid of the light diffracted out of the fiber. In this context, to define the lens profile, the supplying of material should be controlled through a slotted mask.

Referring to FIG. 2b, in another specific embodiment, blazed fiber gratings 5 are comprised of a plurality of gratings of different periods disposed one after the other in the optical fiber 2. Each grating is positioned to couple light of a single frequency out of the optical fiber 2 and to emit that light. In this manner, in the same way as in FIG. 2a, linear arrays of the individual light pulses are able to be formed by means of focusing elements 6 outside of the optical fiber 2.

Figure 3:
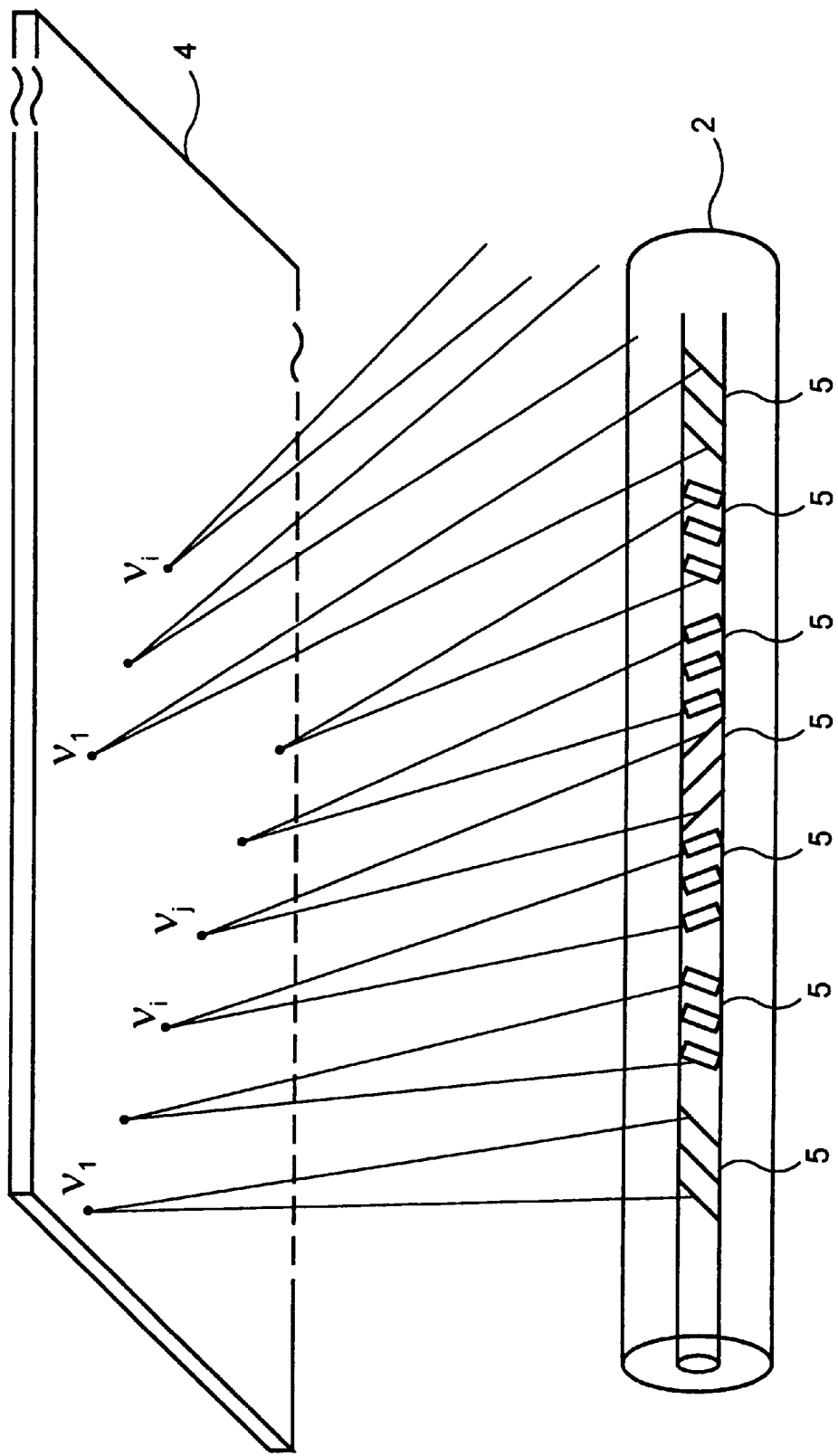
FIG. 3 shows the fiber gratings arranged in a spiral form, according to an embodiment of the present invention.

Referring to FIG. 3, in another specific embodiment, individual blazed fiber gratings 5 are arranged in a spiral form in the optical fiber 2. By this means and in conjunction with suitable focusing elements 6 (here not shown but understood to be similar to those in the other Figures), the pulses are able to be arranged on two-dimensional areals 4, such as a screen, by rows and columns. Each spiral turn of the grating group corresponds more or less to one row where the columns are situated side-by-side. Adjacent row positions correspond to gratings situated one behind the other in the optical fiber 2, with a slightly different osculating plane. Subjacent column positions correspond to gratings lying directly one behind the other in the spiral turns. In place of the spiral-shaped grating configuration, the optical fibers 2 are also able to be coiled or twisted (not shown) and, thus, achieve the same effect of an areal light-pulse array.

Figure 4:
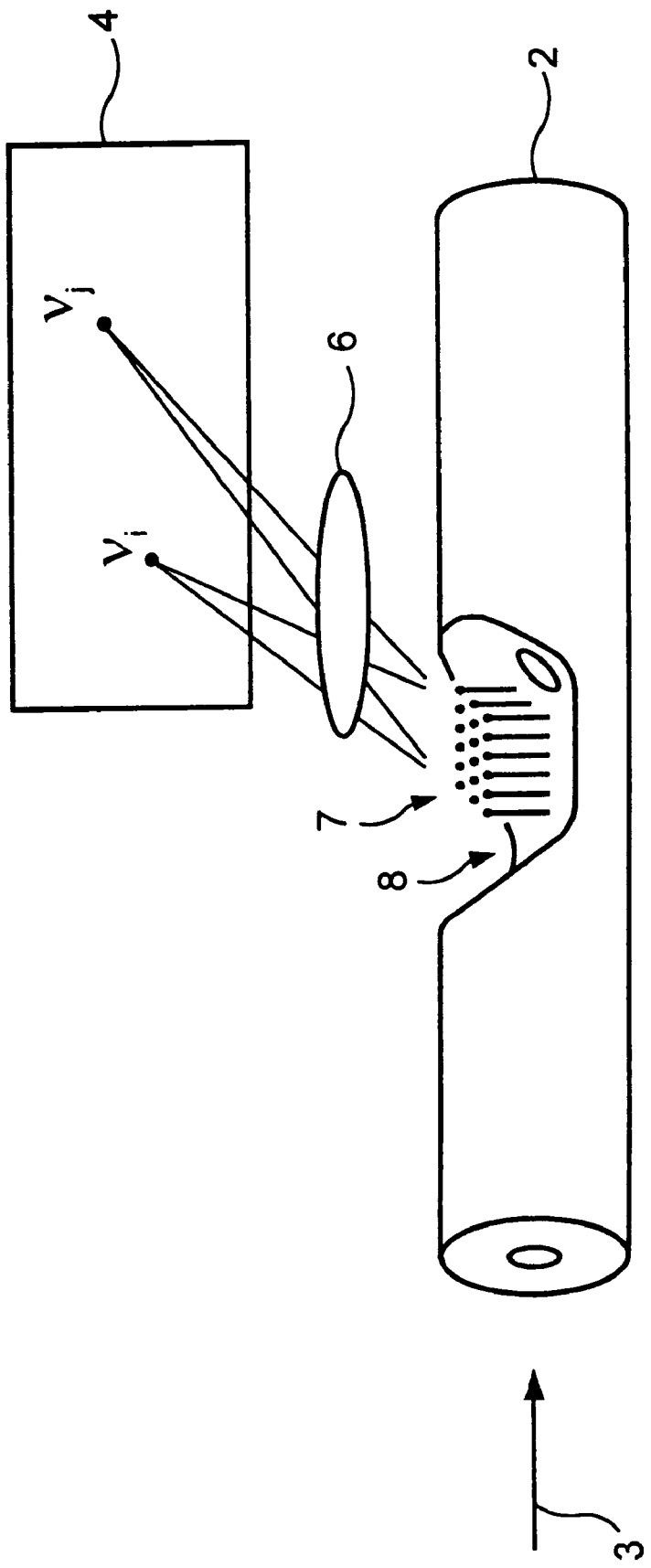
FIG. 4 shows the use of photonic crystals etched into a glass optical fiber for frequency-dividing of light, according to an embodiment of the present invention.

As shown in FIG. 4, in place of light-generated optical fiber gratings, the frequency-dividing elements are also able to be replaced by photonic-crystals 7. Photonic crystals are crystals having lattice constants of a few hundred nanometers, which, in contrast to the fiber gratings described above, comprise fewer individual elements (grating components), since the differences in their refractive index are far greater than those of the fiber gratings. Moreover, resonance effects enhance their efficiency. Photonic crystals and their fabrication are discussed in H. Koops, "Photonic crystals built by three-dimensional additive lithography enable integrated optic of high density," SPIE, vol. 2849/29 (Denver 1996), which article is herein expressly incorporated by reference. The photonic crystals, as with the fiber gratings, may be fashioned as frequency-selective reflectors, prisms, or beam-splitters.

The photonic crystals may be used at the glass-fiber extremities (as shown in FIG. 1), or, as shown in FIG. 4, they are placed in small, etched channels or trenches 8 in the glass optical fiber 2. Such small trenches or channels 8 in the optical fiber 2 may be fabricated for example as in German Patent Application No. 197 13 371.1 (filed March 1997) to H. Koops et al., entitled "Wavelength Decoupling out of D-Profile Fibers Using Photonic Crystals" which is also incorporated by reference herein. In this patent, light is conducted in a D-profile fiber just underneath the surface of the fiber. A slit a few micrometers wide is cut in this fiber surface by means of lithography and dry etching or wet-chemical etching, or by means of laser or ion ablation. Then a photonic crystal is placed exactly in the path of the light by means of additive, three-dimensional lithography and, because of the crystal's selective effect on transmitted light, it enables a small portion of the spectrum to be coupled into the fiber or decoupled out of the fiber. This light from a small spectral range can be decoupled laterally out of the fiber, since photonic crystal media either permit the passage of light or conduct it exclusively inside the matter, provided that the light has a specific wavelength. In this manner, because of the special configuration of the crystal, a portion of the spectrum can be reflected by less than 90° out of the fiber. With the aid of a three-dimensionally constructed lens, the light can also be diverted into a continuing fiber.

Thus, from the channel or trenches, the photonic crystals diffract the light of the frequency $\upsilon_i$ out of the fiber 2. Suitable lattice constants of the photonic crystals 7, situated one behind the other in pits (cut-outs) 8 in the glass optical fiber 2, enable the various frequencies and, thus, light pulses to be coupled out of the fiber 2 and imaged by means of focusing elements on an areal 4 or to be coupled into other waveguides or detectors.

With respect to FIGS. 5a and 5b, when the frequency-dividing elements discussed above are used, the telecommunications transmission takes place with individual light pulse sequences. Each of these sequences comprises of a number of optical pulses, which are spatially separated from one another by the new element and are projected, for example, onto a screen. As one can readily see, referring to FIG. 5a, the pulses reach the screen 4 simultaneously only at certain screen positions. As a delay mechanism for some of the individual light pulse sequences, the screen 4 can be tilted or, in some instances, curved so that all pulses are displayed simultaneously through illumination. In the case of a flat two-dimensional areal, once curved, it takes on a what is referred to herein as a three-dimensional shape.

Rather than using a tilted or curved screen (or in conjunction therewith), a delay can also ensue when the screen 4 is coated with a fluorescent or phosphorescent substance, which phosphoresces until all pulses of one pulse sequence have arrived. To avoid a strong, undesired afterglow, which permits the individual pulse sequences to overlap, electrical or electro-optical switching elements should be used to separate the individual sequences.

Referring to FIG. 5b, in place of a screen, the individual pulses can be collected by glass fibers 9 downstream from the frequency-dividing element and be imaged on a matrix 10. Each individual glass fiber 9 must serve as a delay distance (delay interval) for the pulses that it collects, so that the pulses of one frequency sequence are simultaneously imaged on the matrix 10. Detectors, which take the wide-band property of the pulse sequence into account, are required for the further optical processing. Other delay elements may include air gaps or glass or gradient index prisms.

Instead of glass fibers 9, a direct use of detectors is also possible. Each pulse of one sequence is detected separately, and the delay until further parallel electronic processing ensues in the electric domain.

What is claimed is:

1. An optical telecommunications system, wherein a plurality of individual optical pulses used to carry out digital or analog telecommunication each have a different light frequency, the optical telecommunication system comprising:
   an optical fiber;
   a frequency-dividing optical component for dividing the plurality of individual optical pulses on a basis of the different light frequencies; and
   an areal arranged as a delay element and positioned according to one of an alignment in which the areal is tilted with respect to a direction of incidence of the optical pulses and an alignment in which the areal is curved with respect to the optical pulses, wherein the plurality of individual optical pulses are carried by the optical fiber and are separated by the frequency-dividing optical component, so that the plurality of individual optical pulses are parellely imaged on the areal to enable further processing to take place.

2. The optical telecommunication system as recited in claim 1 further comprising at least one focusing element for focusing at least one of the divided individual optical pulses on the areal.

3. The optical telecommunication system as recited in claim 2 wherein for each of the divided individual optical pulses a corresponding focusing element is present.

4. The optical telecommunication system as recited in claim 1 wherein the frequency-dividing optical component is a spectrograph which enables the optical pulses to be locally separated from one another and arranged on the areal.

5. The optical telecommunication system as recited in claim 1 wherein the areal is a linear areal.

6. The optical telecommunication system as recited in claim 1 wherein the areal is two dimensional.

7. The optical telecommunication system as recited in claim 1 wherein the areal is three dimensional.

8. The optical telecommunication system as recited in claim 1 wherein the areal is shaped so that the plurality of individual optical pulses are parallely imaged on the areal simultaneously.

9. The optical telecommunication system as recited in claim 1 wherein the frequency-dividing optical component is a prism spectrograph.

10. The optical telecommunication system as recited in claim 1 wherein the frequency-dividing optical component is a grating spectrograph.

11. The optical telecommunication system as recited in claim 1 wherein the frequency-dividing optical component is a two-beam interferometer.

12. The optical telecommunication system as recited in claim 1 wherein the frequency-dividing optical component is a multi-beam interferometer.

13. The optical telecommunication system as recited in claim 1 wherein the frequency-dividing optical component is a plurality of fiber gratings disposed in the optical fiber in one of a form of diagonally blazed fiber gratings and a form of spirally configured fiber gratings.

14. The optical telecommunication system as recited in claim 1 wherein the frequency-dividing optical component is a plurality of photonic crystals.

15. The optical telecommunication system as recited in claim 14 wherein the areal is two dimensional.

16. The optical telecommunication system as recited in claim 1 wherein the delay element is one of a fluorescing screen and a phosphorescing screen, both of which equalize discrepancies in a propagation delay of the individual optical pulses through optical decay times.

17. The optical telecommunication system as recited in claim 1 wherein the delay element is one of an air gap and a glass-fiber bundle.

18. The optical telecommunication system as recited in claim 1 wherein the delay element is one of a glass prism and a gradient index prism.

19. An optical telecommunications system, wherein a plurality of individual optical pulses used to carry out digital or analog telecommunication each have a different light frequency, the optical telecommunication system comprising:
    an optical fiber;
    a frequency-dividing optical component for dividing the plurality of individual optical pulses on a basis of the different light frequencies; and
    an areal arranged as a delay element, wherein the plurality of individual optical pulses are carried by the optical fiber and are separated by the frequency-dividing optical component, so that the plurality of individual optical pulses are parellely imaged on the areal to enable further processing to take place, wherein the areal delays selected optical pulses in order to equalize discrepancies in a propagation delay of the individual optical pulses so that a simultaneous further processing can take place.

20. The optical telecommunication system according to claim 19, wherein the areal is arranged to serve as the delay element by being tilted with respect to a direction of incidence of the optical pulses.

21. The optical telecommunication system according to claim 19, wherein the areal is arranged to serve as the delay element by being curved with respect to the optical pulses.

* * * * *